Nov. 19, 1935.  A. K. HANKS  2,021,507
OPTICAL PROJECTION APPARATUS
Original Filed June 14, 1929
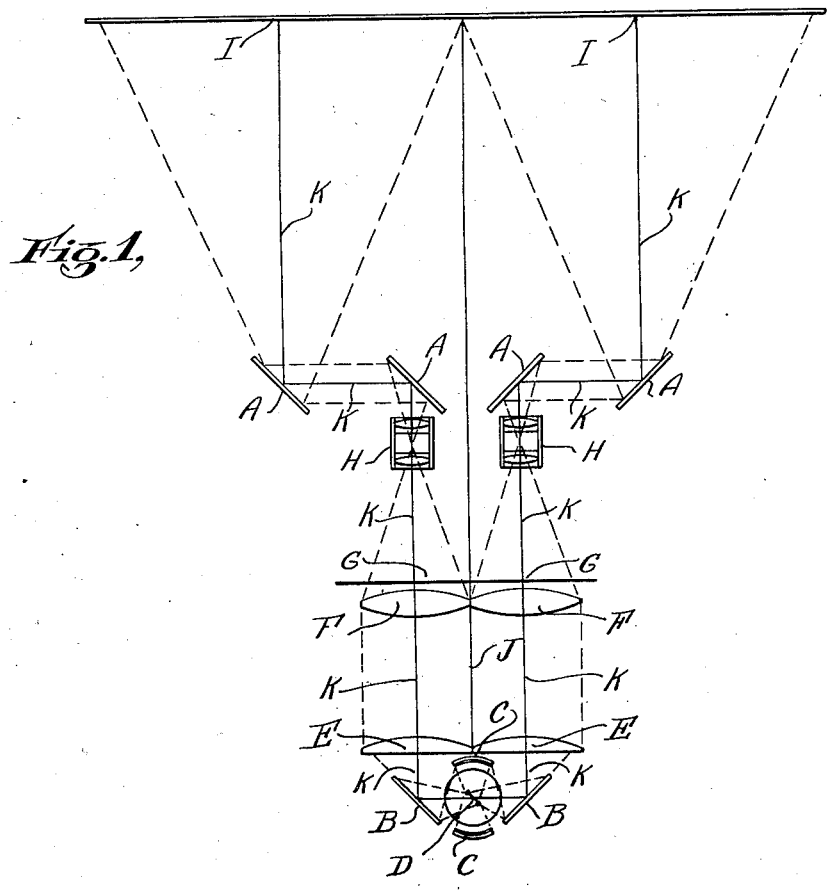
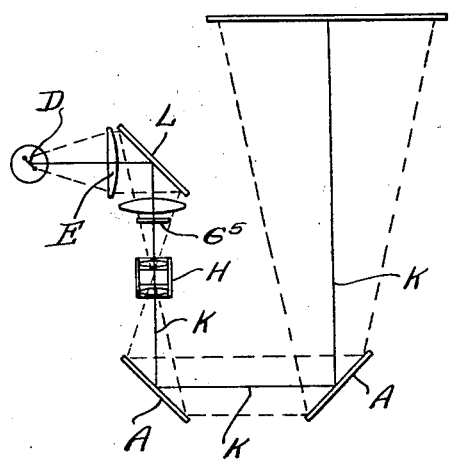
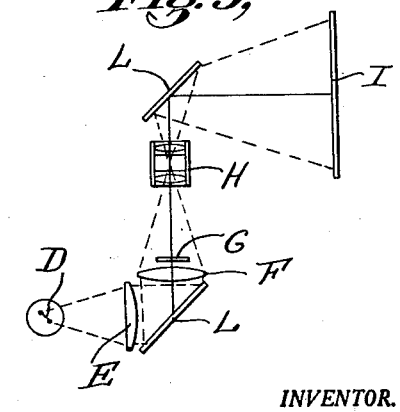
INVENTOR.
Austin K. Hanks.
BY
Frank M. Ashley
ATTORNEYS.

Patented Nov. 19, 1935

2,021,507

UNITED STATES PATENT OFFICE 2,021,507

OPTICAL PROJECTION APPARATUS

Austin K. Hanks, Great Neck, N. Y., assignor to Trans-Lux Daylight Picture Screen Corporation Application June 14, 1929, Serial No. 370,992
Renewed April 16, 1935

2 Claims. (Cl. 88—24)

My invention relates to projection apparatus for use with printing telegraph machines and especially to the type of machine known as a "stock ticker" generally used in offices of stock brokers.

The object of my invention is to provide an apparatus for projecting the characters printed on a tape by the stock ticker, or otherwise, to a screen whereon the characters will appear to an audience in their proper relation to permit reading, said apparatus optically projecting a predetermined portion of a length of said tape by one system of projecting lenses and a further predetermined adjacent following portion by a second system of projection lenses, simultaneously to said screen.

A further object is to provide an apparatus which is designed and adapted to repeat the characters first shown on the screen while projecting new characters thereon.

A further object is to provide an apparatus comprising two projection systems operated simultaneously, the light for both being furnished by a single lamp located between spherical reflecting surfaces which reflect and focus the image of the filament of the lamp back to the filament, and positioning the filament to reflect the light to reflecting surfaces or mirrors located a predetermined distance from and at each side of the lamp, so that the light will be reflected and projected thru the two projecting systems of lenses in such a manner as to project printed characters on the tape simultaneously and in alignment on the screen.

In other words my purpose is to project, optically, a continuous ribbon or image of ticker tape using two complete units of condensing lenses and two matched pairs of projection lenses upon a screen to show a single projected image of said object or printed tape, each system showing one half the length of the visible characters on the tape simultaneously, thus providing a longer strip of illuminated section by the use of relatively small short focus lenses.

Referring to the drawing which illustrates my invention in diagrammatic form:

Fig. 1 is a plan view illustrating the relative arrangement of the lamp and lenses shown on a scale in which the drawing is one half the actual size of an apparatus when made with condensing lenses four inches in diameter, which is adapted to project a continuous image of ticker tape eight inches long, to the screen.

Fig. 2 is an elevational view of a modification showing how the object or tape, may be supported in a horizontal position below the condensers.

Fig. 3 is an elevational view of a modification showing how the object or tape, may be supported in a horizontal position above the condensers.

A—A etc. are reflecting mirrors located adjacent the objective lenses to reflect the image to the screen.

B—B respectively, are reflecting mirrors located adjacent the lamp to reflect the light thru the condensers.

C—C respectively, are spherical surfaced mirrors the focus of which is at the lamp filament D.

E—E respectively, are plano convex condensing lenses.

F—F respectively, are double convex condensing lenses, the optical axis of which are in alignment with the axis of the lenses E—E of their co-operating pair.

G—G is the object or tape, the signs on which are to be projected to a screen.

H—H respectively, are the projection objective lenses having matched focus.

I indicates the screen on which the continuously moving image is projected.

J indicates a diaphragm extending from the adjacent edges of the condensers E to the adjacent edges of the condensers F.

K—K—K etc., indicate the lines of optical centres thru the system.

L—L respectively, indicate reflecting mirrors which reflect the light from the respective condensers E thru the respective condensers F, placed at an angle thereto when the object or tape is held in a horizontal position either above or below the condensers F.

M indicates a diaphragm which prevents overlapping of the light rays of the respective projectors.

The lamp filament D is positioned at an angle of 45 degrees to the focal axis of the reflectors C and the light is projected therefrom as indicated by the dotted lines, as will be readily understood by those skilled in this art.

I prefer to use one Mazda lamp of 110 volts, using 500 watts.

The use of the mirrors C—C is to increase the amount of light from the filament as a point. It is obvious that the system would operate without the use of these mirrors, but less efficiently as considerable light would be lost.

In operating the device, assuming the tape to be moving from right to left across the path of the light rays, the system located at the right side of the apparatus would first project the characters to the screen which characters would be again projected by the system on the left side while the new characters were entering the right side system, as will be readily understood.

By using a single lamp the light will be the same in both sides of the system and the illumination even on the screen, and also the cost of operating is less.

By keeping the axis thru the two projection units parallel to each other, the images of the characters projected to the screen will follow in proper sequence and without distortion.

By the use of two or more projection devices placed side by side and using short focus lenses, the length of film shown simultaneously may be materially increased without the loss of light which would result if large long focus lenses were used in a single device for projecting an equal length of tape, optically, to a screen, and the cost of making the dual projector is probably no greater than that of a similar single machine adapted to render the same service.

It will be noticed that the tape exposed to the light rays is continuously exposed from the time it enters the first projector until it leaves the last one, so that there is no space that is not illuminated while the characters are being projected in proper sequence on the screen, and for this reason the projectors are placed close together so that the tape may be guided as illustrated to obtain the desired result.

It will be obvious that two or more lamps may be used together with their respective reflectors, if placed in alignment between the reflectors B—B respectively, instead of using a single lamp, in case a high power lamp should not be available, or for any other reason; but I prefer to use a single high candle power lamp of the Mazda type, with the filament placed at an angle as illustrated in the drawing. Other modifications may be made without departing from the disclosure of the invention herein described.

Having thus described my invention I claim as new:

1. An optical projection apparatus comprising two separate projectors placed adjacent with the axis through the condensers of each projector arranged parallel with each other, a tape adapted to move with respect to said projectors in such manner that a given tape character traverses said projectors in succession, a lamp, means for reflecting the light from said lamp through both of said projectors simultaneously, and a spherical surfaced reflector located at each side of said lamp, the focus of the reflectors being substantially at the lamp filament, and said reflectors increasing the amount of light reaching said reflecting means.

2. An optical projection apparatus comprising two separate projectors placed adjacent with the axis thru the condensers of each projector arranged parallel to each other, a lamp the filament of which is placed at an angle to the axis of the condensers, a spherical reflecting surface located at each side of the lamp, the focus of the reflecting surfaces being substantially at the lamp filament, means for reflecting the light from the lamp and said reflecting surfaces simultaneously thru said condensers, and a tape extending across the axis of each projector and adapted to move with respect to said projectors in such manner that a given tape character traverses said projectors in succession.

AUSTIN K. HANKS.